United States Patent
Miyake (10) Patent No.: US 10,764,550 B2
(45) Date of Patent: Sep. 1, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Toshihisa Miyake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/200,350

(22) Filed: Nov. 26, 2018

(65) Prior Publication Data

US 2019/0174107 A1 Jun. 6, 2019

(30) Foreign Application Priority Data

Dec. 1, 2017 (JP) .................. 2017-231970
Oct. 12, 2018 (JP) .................. 2018-193495

(51) Int. Cl.
*H04N 9/73* (2006.01)
*H04N 5/243* (2006.01)
*G06T 7/90* (2017.01)
*H04N 7/18* (2006.01)

(52) U.S. Cl.
CPC .............. *H04N 9/735* (2013.01); *G06T 7/90* (2017.01); *H04N 5/243* (2013.01); *G06T 2207/10016* (2013.01); *G06T 2207/10024* (2013.01); *H04N 7/18* (2013.01)

(58) Field of Classification Search
CPC .......... H04N 9/735; H04N 5/243; H04N 7/18; G06T 7/90; G06T 2207/10024; G06T 2207/10016
See application file for complete search history.

(56) References Cited

U.S. PATENT DOCUMENTS

| 2004/0090550 A1* | 5/2004 | Park ................. H04N 5/23212 348/350 |
| 2009/0207274 A1 | 8/2009 | Park |
| 2011/0261424 A1* | 10/2011 | Matsuoka ............... H04N 1/40 358/505 |
| 2014/0071310 A1* | 3/2014 | Kai .................. G06K 9/00281 348/223.1 |
| 2015/0062373 A1 | 3/2015 | Nishida |
| 2015/0334267 A1 | 11/2015 | Hirakawa |
| 2017/0132765 A1 | 5/2017 | Sato |

FOREIGN PATENT DOCUMENTS

| JP | 2002-034053 A | 1/2002 |
| JP | 2010-147651 A | 7/2010 |

* cited by examiner

*Primary Examiner* — Mekonnen D Dagnew
(74) *Attorney, Agent, or Firm* — Canon U.S.A., Inc. IP Division (57) ABSTRACT

An image processing apparatus determines an achromatic region position based on an achromatic region detected in first image data obtained by image capturing, and calculates a color correction parameter used for performing color correction processing on second image data obtained by image capturing performed later than that of the first image data, wherein the color correction parameter is calculated based on color information about a position in the second image data corresponding to the determined achromatic region position.

15 Claims, 12 Drawing Sheets

IMAGE PROCESSING APPARATUS, IMAGE PROCESSING METHOD, AND STORAGE MEDIUM

BACKGROUND

Field of the Disclosure

Aspects of the present disclosure generally relate to an image processing apparatus, an image processing method, and a storage medium each of which is suitable for use to adjust the color of a captured image.

Description of the Related Art

There is known a conventional method of, to adjust white balance, extracting an achromatic region from an image signal and adjusting the color of the entire captured image based on the extracted achromatic region.

The method of extracting an achromatic region includes a known method of extracting a region low in color saturation from an image obtained by an imaging apparatus. However, in environments in which sufficient illuminance is not attained, since the color saturation of the entire captured image becomes low, a region which is originally chromatic may be falsely recognized as an achromatic region, and, under a light source strong in specific wavelength domain, an achromatic region may be falsely recognized as a chromatic region. Therefore, in low-illuminance environments or under a specific light source, notwithstanding that image capturing has been performed on the same subject, the color tone of the subject may not be able to be correctly reproduced.

To solve this issue, there is a proposal for a method in which, in adjusting white balance, information about an image that was previously captured is used. Japanese Patent Application Laid-Open No. 2002-34053 discusses a method of previously storing the respective gain values of red, green, and blue (RGB) of an image that was previously captured and then using the stored gain values in a case where a light source is unable to be determined. Moreover, Japanese Patent Application Laid-Open No. 2010-147651 discusses a method of previously storing an achromatic region included in an image that was captured at wide-angle setting and performing adjustment of color based on the stored achromatic region at the time of playback.

SUMMARY

According to one or more aspects of the present disclosure, and to provide further enhancements to image processing technology, an image processing apparatus that processes image data obtained by image capturing includes a determination unit configured to determine an achromatic region position based on an achromatic region detected in first image data obtained by the image capturing, and a calculation unit configured to calculate a color correction parameter used for performing color correction processing on second image data obtained by image capturing performed later than that of the first image data, wherein the calculation unit calculates the color correction parameter based on color information about a position in the second image data corresponding to the achromatic region position determined by the determination unit.

Further features and aspects of the present disclosure will become apparent from the following description of exemplary embodiments with reference to the attached drawings.

BRIEF DESCRIPTION OF THE DRAWINGS

FIG. 11, which is composed of FIGS. 11A and 11B, is a flowchart illustrating an example of a processing procedure for performing white balance control in the fourth exemplary embodiment.

DESCRIPTION OF THE EMBODIMENTS

Various exemplary embodiments, features, and aspects of the present disclosure will be described in detail below with reference to the accompanying drawings.

Figure 1:
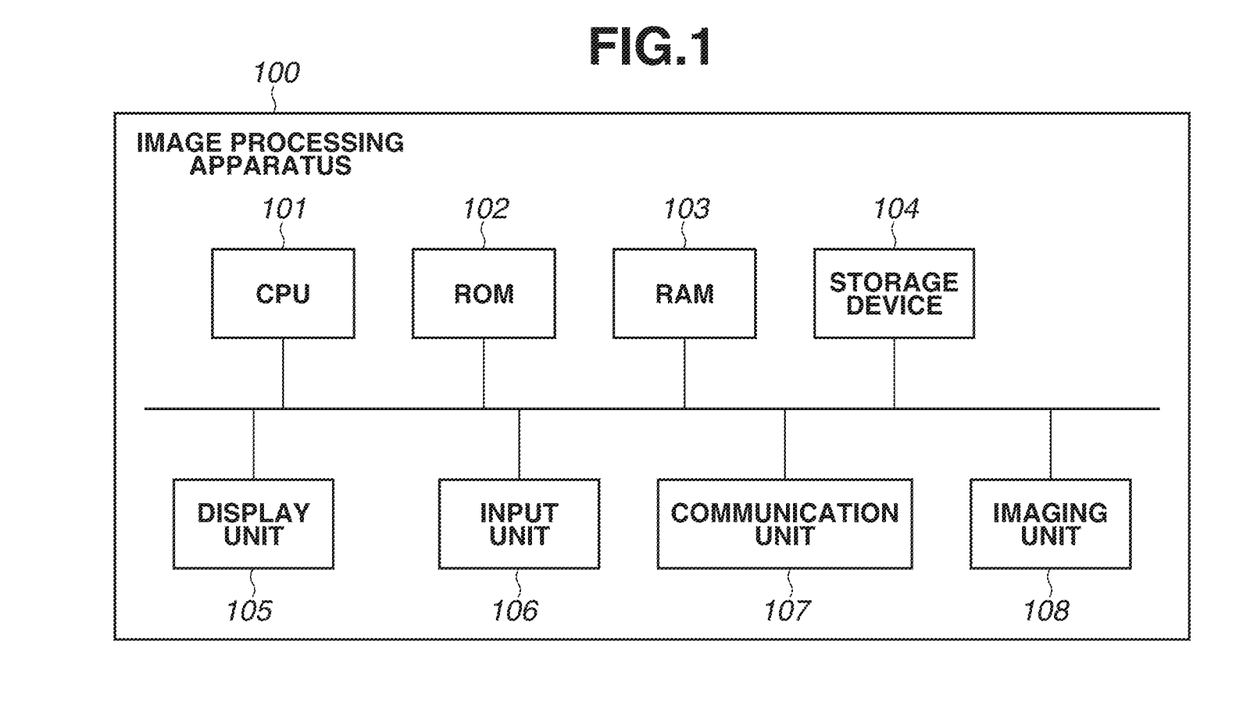
FIG. 1 is a block diagram illustrating a hardware configuration example of an image processing apparatus.

FIG. 1 is a block diagram illustrating a hardware configuration example of an image processing apparatus 100 according to a first exemplary embodiment of the present invention. The image processing apparatus to be used in the first exemplary embodiment includes, for example, an apparatus installed in a specific position, such as a monitoring camera. The image processing apparatus 100 includes a central processing unit (CPU) 101, a read-only memory (ROM) 102, a random access memory (RAM) 103, a storage device 104, a display unit 105, an input unit 106, a communication unit 107, and an imaging unit 108. The CPU 101, which may include one or more processors, one or more memories, circuitry, combinations thereof, or the like, may read out a control program stored in the ROM 102 and perform control for various processing operations, such as image capturing, storage, communication, display, and input and output. The RAM 103 is used as a temporary storage region, such as a main memory and a work area, for the CPU 101. The storage device 104 is, for example, a removable memory, and stores, for example, various pieces of data and various programs. Furthermore, the storage device 104 can be a built-in type memory. The display unit 105 displays various pieces of information. The input unit 106 receives various operations performed by the user.

The communication unit 107 performs communication processing with an external apparatus, such as an image forming apparatus, via a network. Moreover, as another example, the communication unit 107 can perform communication with an external apparatus via wireless. The imaging unit 108 is configured with, for example, an image sensor, a lens group, and an analog-to-digital (A/D) converter, and generates image data. Furthermore, functions and processing operations of the image processing apparatus 100 described below are implemented by the CPU 101 reading out a program stored in, for example, the ROM 102 and executing the read-out program.

Furthermore, the above-mentioned hardware configuration is merely an example, and one piece of hardware does not necessarily correspond to one configuration. For example, a plurality of processors cooperating with each other can function as one control unit, or a single processor can function as a plurality of units. Moreover, at least a part of control performed by the image processing apparatus 100 can be implemented by a hardware circuit.

Moreover, a part of the configuration illustrated in FIG. 1 can be included in an apparatus different from the image processing apparatus 100. For example, in the case of a monitoring camera, a system composed of a monitoring camera body, which handles image capturing and image outputting, and a control terminal, which displays and stores an image transmitted from the monitoring camera body, is envisaged. In this case, the control terminal functions as the image processing apparatus 100, and the image processing apparatus 100 does not necessarily need the imaging unit 108. An image captured by the monitoring camera body is then assumed to be received from the communication unit 107 of the control terminal.

Next, white balance control in which, in a case where the image processing apparatus 100 in the first exemplary embodiment has not been able to detect an achromatic region, the image processing apparatus 100 uses an achromatic region that was previously detected is described with reference to FIG. 2. In a case where the image processing apparatus 100 in the first exemplary embodiment has not been able to detect an achromatic region, the image processing apparatus 100 is able to obtain an adjusting criterion for white balance.

Figure 2:
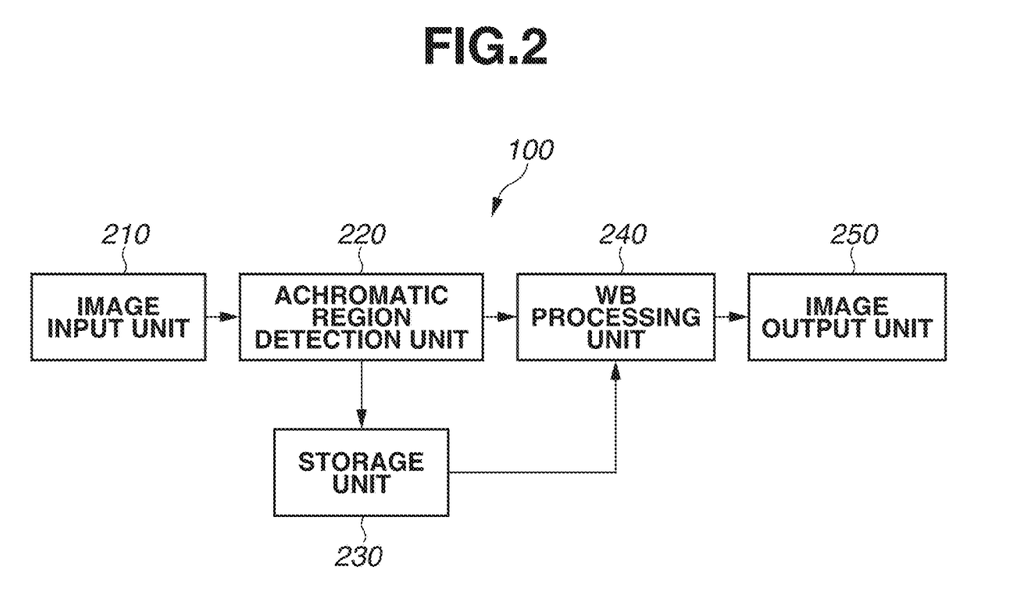
FIG. 2 is a block diagram illustrating a functional configuration example of an image processing apparatus according to a first exemplary embodiment.

FIG. 2 is a block diagram illustrating a functional configuration example for storing information about an achromatic region and performing control to adjust white balance with use of the information about an achromatic region under the control of the CPU 101 of the image processing apparatus 100 according to the first exemplary embodiment.

Referring to FIG. 2, an image input unit 210 acquires image data from, for example, the imaging unit 108 or the storage device 104. As mentioned above, in a case where the image processing apparatus 100 is a control terminal, the image input unit 210 acquires image data from the communication unit 107. An achromatic region detection unit 220 detects an achromatic region, such as a white region or a gray region, which is used for white balance processing described below, from image data acquired by the image input unit 210, and outputs coordinate position information about the detected achromatic region. A storage unit 230 is equivalent to, for example, the storage device 104, and stores coordinate position information about an achromatic region detected by the achromatic region detection unit 220.

A white balance (WB) processing unit 240 acquires coordinate position information about an achromatic region from the achromatic region detection unit 220 or the storage unit 230. Then, the WB processing unit 240 performs white balance processing (correction), which is one type of color processing (correction), by adjusting the gain values of respective colors in such a manner that the achromatic region comes closer to achromatic color. This processing is described below. An image output unit 250 outputs an image obtained by processing performed by the WB processing unit 240 to the display unit 105 or the communication unit 107. Furthermore, as mentioned above, each function illustrated in FIG. 2 can be a function that is implemented by a plurality of, for example, CPUs, ROMs, and RAMs cooperating with each other, or can be a function that is implemented by a hardware circuit.

Figure 3:
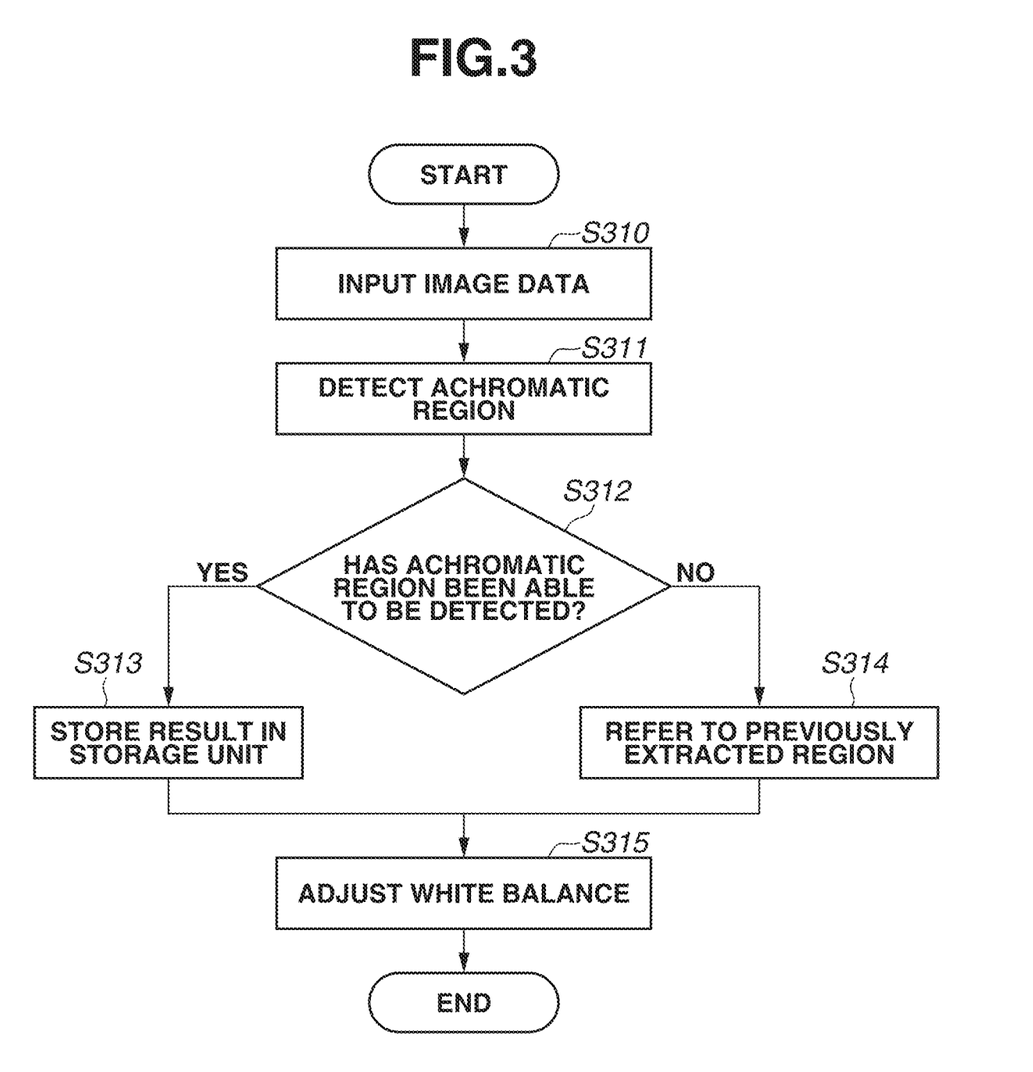
FIG. 3 is a flowchart illustrating an example of a processing procedure for performing white balance control in the first exemplary embodiment.

FIG. 3 is a flowchart illustrating an example of a processing procedure for performing white balance control in the first exemplary embodiment.

First, in step S310, the image input unit 210 acquires image data. Next, in step S311, the achromatic region detection unit 220 acquires values of RGB or color-difference information such as CrCb on a pixel basis or a predetermined block basis from image data acquired in step S310. Then, in step S312, the achromatic region detection unit 220 determines whether values of RGB or color-difference information such as CrCb is within a predetermined threshold value range. This predetermined threshold value range indicates a range of colors representing achromatic color, and is assumed to be previously stored in the ROM 102. In other words, in step S312, the achromatic region detection unit 220 determines whether a target pixel or block has been able to be detected as an achromatic region. If it is determined that the values of RGB or color-difference information such as CrCb is within the predetermined threshold value range (YES in step S312), the processing proceeds to step S313, and if not (NO in step S312), the processing proceeds to step S314.

In step S313, the achromatic region detection unit 220 stores coordinate position information about the area detected as an achromatic region in the storage unit 230. Furthermore, in a case where coordinate position information is already stored in the storage unit 230, the achromatic region detection unit 220 overwrites the coordinate position information to be stored. On the other hand, in step S314, the achromatic region detection unit 220 acquires, from the storage unit 230, coordinate position information about an achromatic region that was previously detected (in other words, that was previously stored in step S313). Then, in step S315, the WB processing unit 240 performs white balance processing on image data by adjusting gain values (correction parameters) of the respective colors in such a manner that the color difference of the achromatic region becomes smaller with use of the coordinate position information about the achromatic region. At this time, in a case where, in step S314, coordinate position information about an achromatic region that was previously stored is acquired, the WB processing unit 240 adjusts gain values of the respective colors in such a manner that the color difference of a region indicated by the coordinate position information becomes smaller. In other words, the WB processing unit 240 performs control to make the region previously determined to be an achromatic region achromatic. This is based on the assumption that, in a case where, for example, a monitoring camera (a fixed-point camera) is used to continuously acquire image data at a constant angle, the coordinates of an achromatic region (for example, the wall of a building) do not change even if time passes.

Figure 4A:
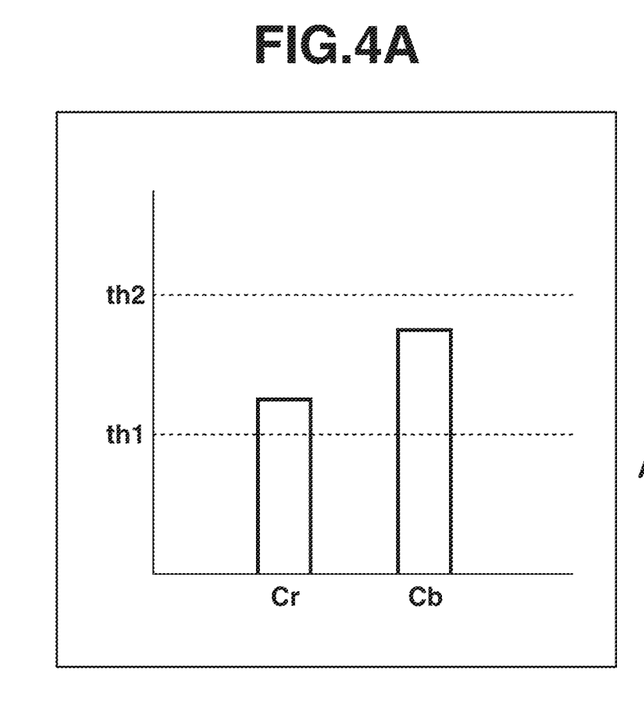
FIGS. 4A and 4B are diagrams used to explain an example in which white balance is adjusted based on an achromatic region.
Figure 4B:
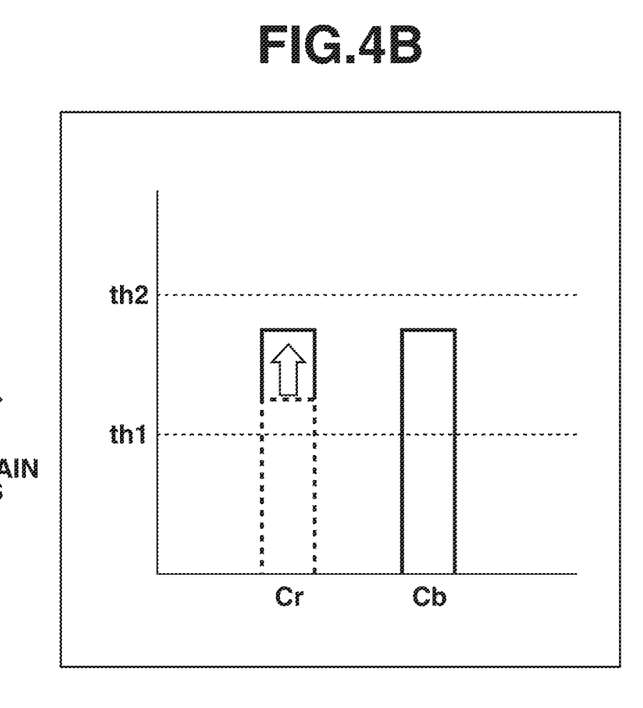

FIG. 4A is a diagram used to explain an example in which an achromatic region has been detected. In step S312, when each of color-difference signals Cr and Cb is within a range from a threshold value th1 to a threshold value th2, the achromatic region detection unit 220 determines that the target region is an achromatic region, and, when at least one of color-difference signals Cr and Cb is outside such a range, the achromatic region detection unit 220 determines that the target region is a chromatic region. Moreover, FIG. 4B is a diagram used to explain an example in which white balance has been adjusted, and, in step S315, the WB processing unit 240 adjusts the gain values of color-difference signals Cr and Cb in such a manner that the region detected as an achromatic region comes closer to achromatic color.

Figure 5A:
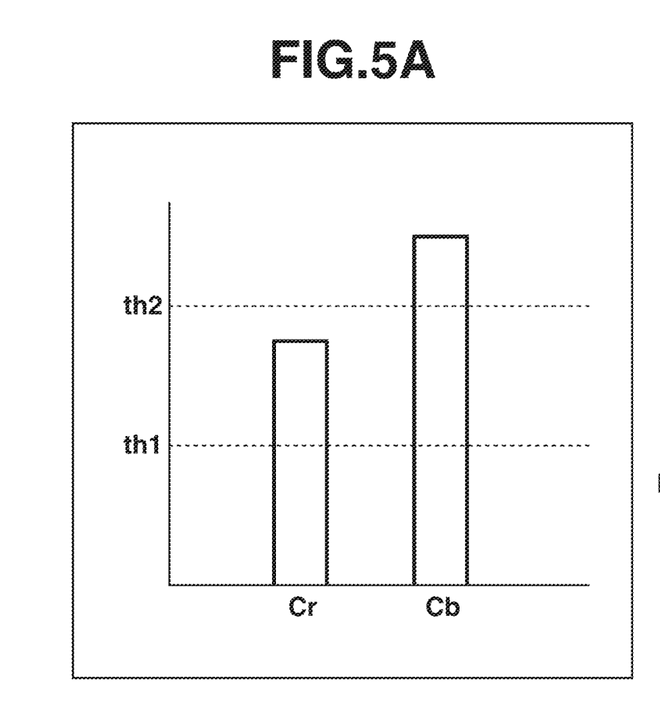
FIGS. 5A and 5B are diagrams used to explain an example in which, under low illuminance, it becomes impossible to detect an achromatic region.
Figure 5B:
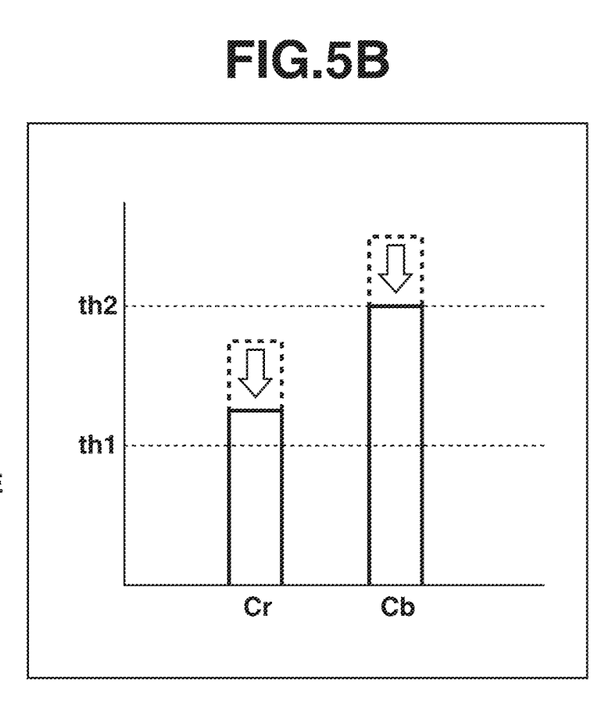

FIGS. 5A and 5B are diagrams used to explain an example in which, under low illuminance, it becomes impossible to detect an achromatic region. Since color saturation decreases under low illuminance, a region which may be originally determined to be a chromatic region because of a large color difference as illustrated in FIG. 5A may also be regarded as a region in which color-difference signals Cr and Cb are within a range from the threshold value th1 to the threshold value th2 for an achromatic region, as illustrated in FIG. 5B. This may cause a chromatic region to be falsely recognized as an achromatic region. Therefore, in a case where, in step S312, the luminance Y of image data is less than a predetermined threshold value, even if the color-difference signals Cr and Cb are within a range from the threshold value th1 to the threshold value th2 for an achromatic region, the image processing apparatus 100 according to the first exemplary embodiment is configured not to determine that the target region is an achromatic region. This is because, if control of white balance is performed in such a condition, an achromatic region serving as a criterion is not able to be determined, so that original colors cannot be attained. Furthermore, while, in the above description, the luminance Y is used as a base not to determine that the target region is an achromatic region, in a case where the luminance Y is less than a predetermined value, the range used to determine that the target region is an achromatic region can be made narrower. For example, it is conceivable that the threshold value th1 can be made larger or the threshold value th2 can be made smaller.

As described above, according to the first exemplary embodiment, even in a case where an achromatic region has not been able to be detected, a region that was previously able to be detected as an achromatic region is used as a criterion for white balance adjustment. For example, in a case where there are little changes in targets for image capturing as in the case of a monitoring camera, since it is highly possible that the previous achromatic region and the current achromatic region are consistent with each other, original colors can be attained by using the previous achromatic region as a criterion.

Furthermore, in some cases, the coordinates of an achromatic region may be changed by an angle of view being changed by panning or tilting or optical zooming of a camera. In a case where the angle of view has changed in this way, the coordinates of an achromatic region stored in the storage unit 230 can be deleted or can be made ineffective so as to be made unusable. Moreover, the coordinates of an achromatic region obtained after a change of the angle of view can be calculated based on the angle of panning or tilting or the magnification of optical zooming and can be newly stored in the storage unit 230.

Next, a second exemplary embodiment of the present disclosure is described. The first exemplary embodiment is based on the assumption that, in the case of continuously acquiring image data at a constant angle of view, the coordinates of an achromatic region (for example, the wall of a building) do not change even if time passes. However, in a case where, even without a change in angle of view, for example, an achromatic moving body is present in the angle of view, the achromatic region may change over time. Therefore, in the second exemplary embodiment, to solve such a problem that, in a case where a change occurs in the angle of view so that there is a change in achromatic region, the accuracy of an achromatic region that is previously stored decreases, weighting is provided for each region. Furthermore, a hardware configuration of the image processing apparatus according to the second exemplary embodiment is similar to that illustrated in FIG. 1, and is, therefore, omitted from description.

Figure 6:
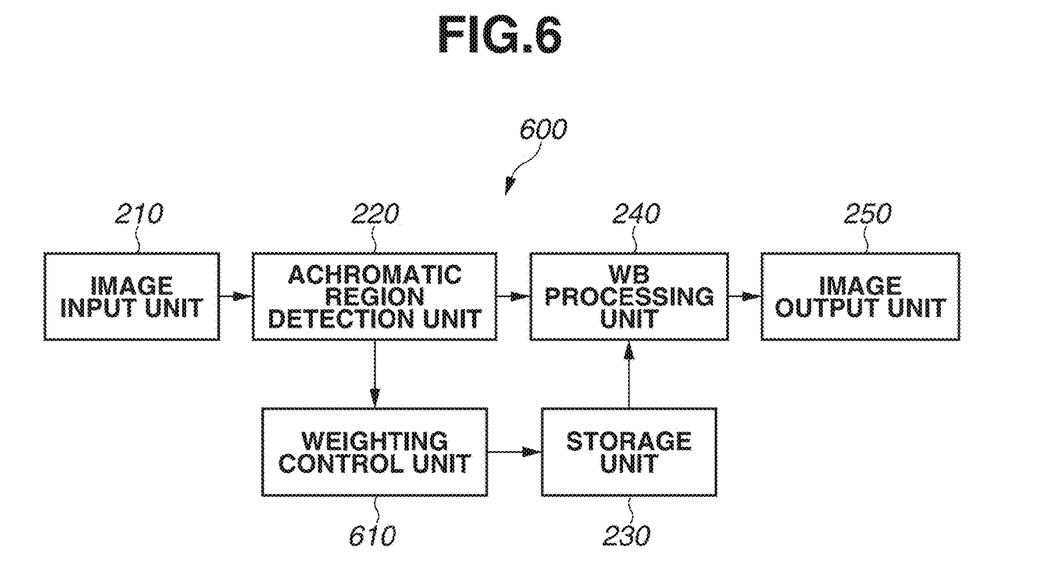
FIG. 6 is a block diagram illustrating a functional configuration example of an image processing apparatus according to a second exemplary embodiment.

FIG. 6 is a block diagram illustrating a functional configuration example of an image processing apparatus 600 according to the second exemplary embodiment. In the following description, only a function different from the functions illustrated in FIG. 2 is described.

In the first exemplary embodiment, coordinate position information about the detected achromatic region is directly stored. On the other hand, in the second exemplary embodiment, a weighting control unit 610 is provided to compare coordinate position information about an achromatic region detected by the achromatic region detection unit 220 and coordinate position information about an achromatic region stored in the storage unit 230 with each other and to perform addition of weighting for respective regions.

Figure 7:
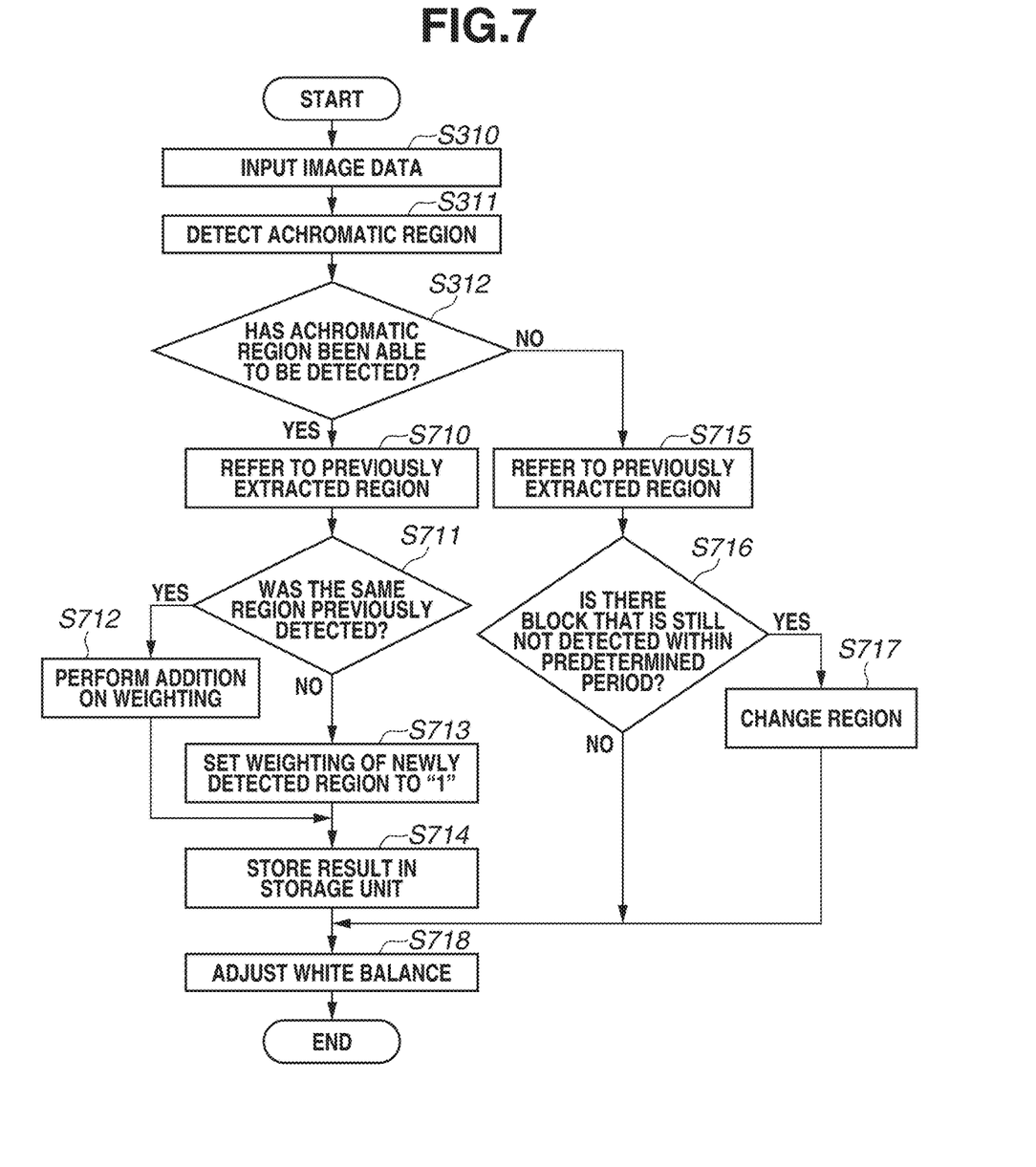
FIG. 7 is a flowchart illustrating an example of a processing procedure for performing white balance control in the second exemplary embodiment.

FIG. 7 is a flowchart illustrating an example of a processing procedure for performing white balance control in the second exemplary embodiment. In the following description, processing operations similar to those illustrated in FIG. 3 are omitted from description.

If, in step S312, it is determined that the values of RGB or color-difference information such as CrCb is within the predetermined threshold value range (an achromatic region has been detected) (YES in step S312), the processing proceeds to step S710. Then, in step S710, the weighting control unit 610 reads out, from the storage unit 230, and refers to coordinate position information and weighting information about a region previously detected as an achromatic region.

Figure 8A:
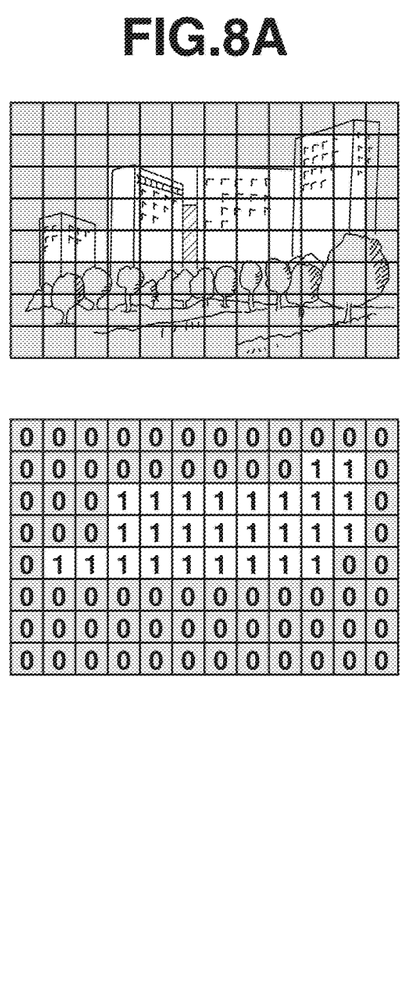
FIGS. 8A, 8B, and 8C are diagrams used to explain processing for performing addition of weighting.
Figure 8B:
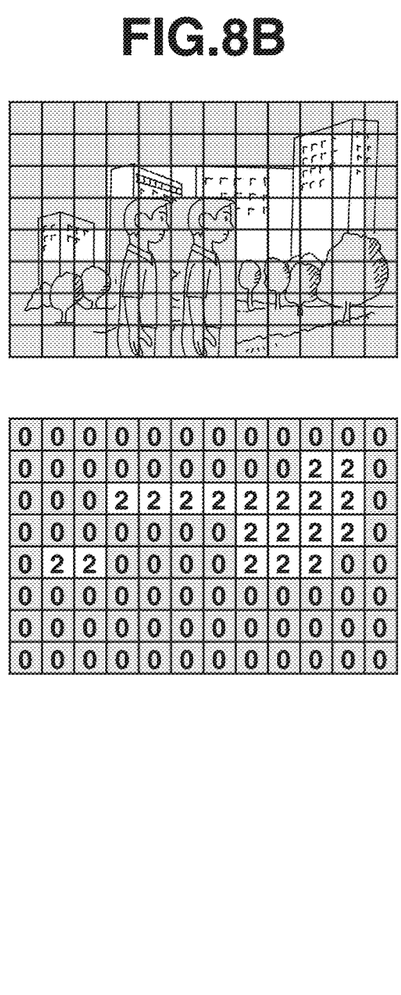
Figure 8C:
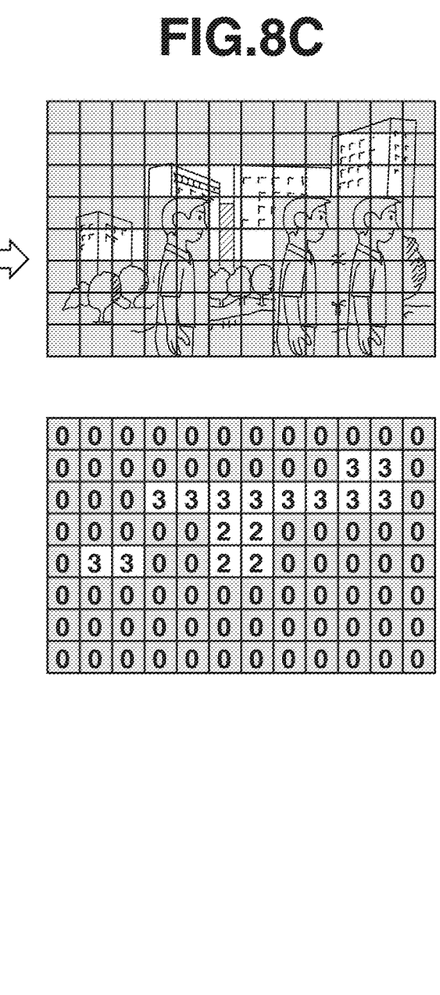

Next, in step S711, the weighting control unit 610 compares a region currently detected as an achromatic region and a region previously detected as an achromatic region (including a portion which is a region having a weighting of "1" or more and which is currently excluded from achromatic regions) with each other. Then, the weighting control unit 610 determines whether there is a region consistent with a region previously detected as an achromatic region. If, in step S711, it is determined that there is a region consistent with a region previously detected as an achromatic region (YES in step S711), then in step S712, the weighting control unit 610 performs addition on the weighting of the consistent region, and sets the weighting to "1" in a region that is not consistent. Specifically, as illustrated in FIGS. 8A, 8B, and 8C, the weighting control unit 610 performs weighting for each of a plurality of divided blocks, and performs addition of a weighting of "1" in a block consistent as an achromatic region. On the other hand, if, in step S711, it is determined that there is no consistent region (NO in step S711), then in step S713, the weighting control unit 610 sets the weighting of a region currently detected as an achromatic region to "1". Then, in step S714, the weighting control unit 610 stores coordinate position information and new weighting information about the achromatic region in the storage unit 230.

On the other hand, if, in step S312, it is determined that the values of RGB or color-difference information such as CrCb is outside the predetermined threshold value range (no achromatic region has been able to be detected) (NO in step S312), the processing proceeds to step S715. Then, in step S715, the achromatic region detection unit 220 acquires, from the storage unit 230, coordinate position information and weighting information about an achromatic region that was previously detected.

Next, in step S716, the achromatic region detection unit 220 determines whether there is a block that is still not detected as an achromatic region within a predetermined period from among blocks for achromatic regions. If, in step S716, it is determined that there is a block that is still not detected as an achromatic region within a predetermined period (YES in step S716), the block is low in the degree of reliability of being an achromatic region. Therefore, in step S717, the achromatic region detection unit 220 changes the range of the achromatic region and stores coordinate position information and weighting information about a new achromatic region in the storage unit 230. Specifically, as indicated by an example illustrated in FIGS. 8B and 8C, in the case of a block which has a weighting of "1" or more but the weighting of which is not changed within a predetermined period, the achromatic region detection unit 220 excludes the block from achromatic regions. On the other hand, if, in step S716, it is determined that there is no block that is still not detected as an achromatic region within a predetermined period (NO in step S716), the processing directly proceeds to step S718.

In step S718, the WB processing unit 240 performs white balance processing on image data by adjusting gain values in such a manner that achromatic regions the weighting of which is high (for example, in the example illustrated in FIGS. 8A to 8C, regions having weights of 3 or more) come closer to white, with use of coordinate position information and weighting information about achromatic regions stored in the storage unit 230.

FIGS. 8A to 8C are diagrams used to explain an example in which addition of weighting is performed to set achromatic regions. For example, in a case where some of regions having a weighting of "1" illustrated in FIG. 8A are consistent with some of the currently detected achromatic regions, in step S712, as illustrated in FIG. 8B, the weighting is increased to "2" by addition in the corresponding regions. After that, regions having a weighting of "1" in FIG. 8B are determined to be regions which are not detected as an achromatic region within a predetermined period, and, in step S717, those regions are excluded from achromatic regions. Next, in a case where some of areas having a weighting of "1" or "2" illustrated in FIG. 8B are consistent with some of the currently detected achromatic regions, in step S712, as illustrated in FIG. 8C, the weighting is increased to "2" or "3" by addition in the corresponding regions. The regions the weighting of which has been changed from "1" to "2" by this processing become handled as some of achromatic regions. After that, some of regions having a weighting of "2" in FIG. 8C are determined to be regions which are not detected as an achromatic region within a predetermined period, and, in step S717, those regions are excluded from achromatic regions.

As described above, according to the second exemplary embodiment, an achromatic region that was previously detected and an achromatic region that has currently been detected are compared with each other and addition of weighting is accordingly performed. With this, in a case where no achromatic region is able to be detected and previous information is, therefore, referred to, it becomes possible to perform color adjustment based on a region having a higher possibility of being an achromatic region. Furthermore, the "predetermined period" used in the determination performed in step S716 can be changed according to a numerical value of weighting. For example, in the case of a block the numerical value of weighting for which is high, the "predetermined period" can be a long period, and, in the case of a block the numerical value of weighting for which is low, the "predetermined period" can be a short period.

Moreover, according to the second exemplary embodiment, even in a case where there is a change in frame in which image capturing is being performed and achromatic regions are changing, appropriate colors can be obtained. If, in a scene in which achromatic regions are changing, the regions are simply stored as achromatic regions, even a region which has changed from an achromatic region to a chromatic region would be handled as an achromatic region serving as a criterion for white balance adjustment. However, applying weighting to achromatic regions enables supposing that a region a result of weighting for which is high is a place which has a higher possibility of having previously been an achromatic region and in which a change is unlikely to occur. Therefore, performing white balance adjustment in such a manner that a region a result of weighting for which is high becomes more achromatic enables obtaining appropriate colors.

Next, a third exemplary embodiment of the present disclosure is described. In the third exemplary embodiment, an image which is acquired in a case where normal white balance control is performed can be additionally obtained. Furthermore, a hardware configuration of the image processing apparatus according to the third exemplary embodiment is similar to that illustrated in FIG. 1, and is, therefore, omitted from description.

Figure 9:
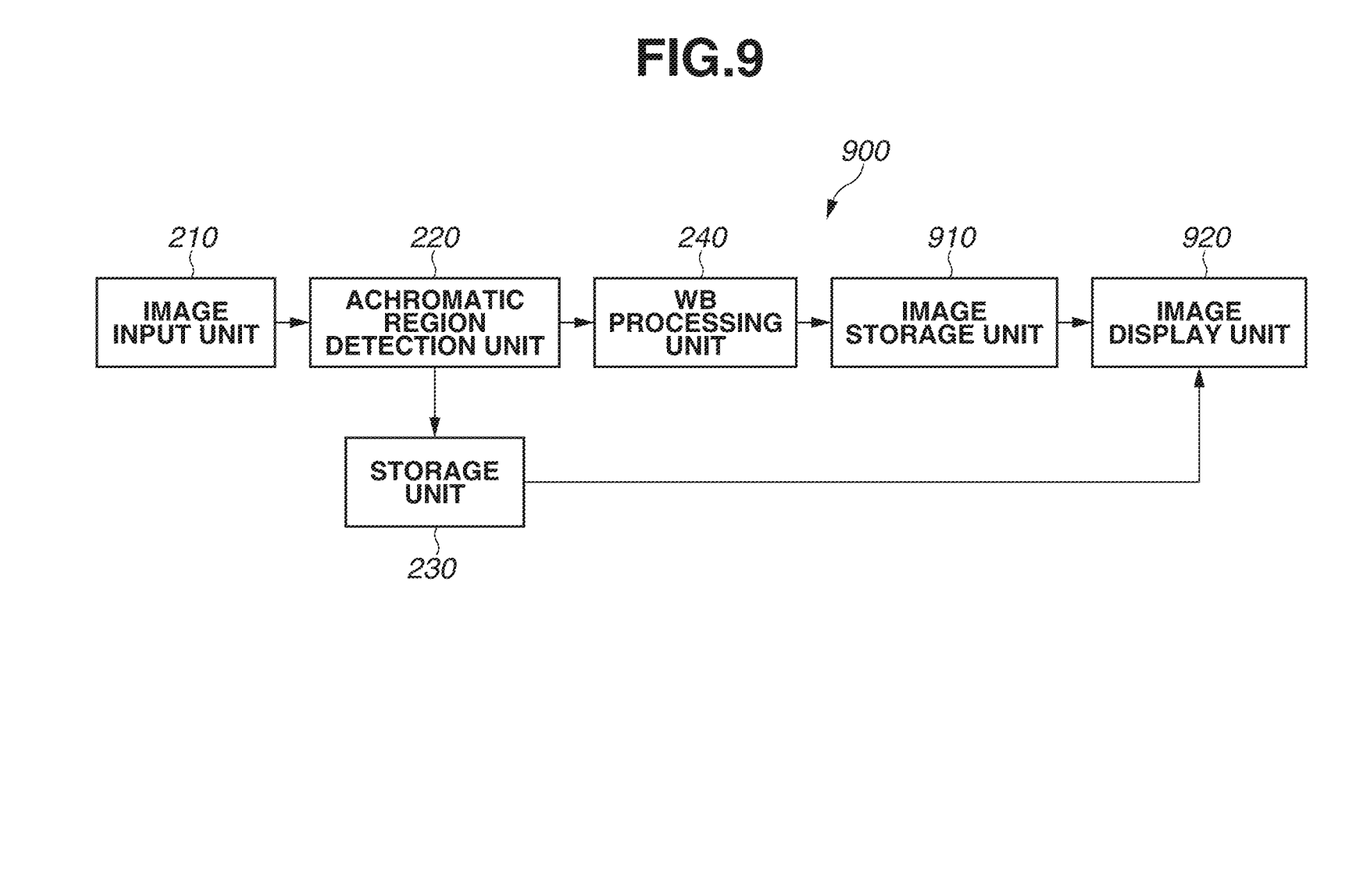
FIG. 9 is a block diagram illustrating a functional configuration example of an image processing apparatus according to a third exemplary embodiment.

FIG. 9 is a block diagram illustrating a functional configuration example of an image processing apparatus 900 according to the third exemplary embodiment. In the following description, only functions different from the functions illustrated in FIG. 2 are described.

An achromatic region detection unit 220 detects an achromatic region, such as a white region or a gray region, which is used for white balance processing described below, and outputs coordinate position information about the detected achromatic region. Then, when having detected an achromatic region, the achromatic region detection unit 220 stores coordinate position information about the detected achromatic region in a storage unit 230. A WB processing unit 240 performs white balance processing by adjusting gain values of the respective colors in such a manner that the achromatic region acquired by the achromatic region detection unit 220 comes closer to achromatic color. In this processing, the WB processing unit 240 performs normal white balance processing which is known. Then, the WB processing unit 240 stores a result of this processing in an image storage unit 910, which is equivalent to the storage device 104.

An image display unit 920 performs color adjustment on image data stored in the image storage unit 910 with use of coordinate position information about achromatic regions stored in the storage unit 230. Then, the image display unit 920 outputs the image data subjected to color adjustment to the display unit 105. Moreover, the image display unit 920 also directly outputs image data stored in the image storage unit 910 to the display unit 105.

As described above, according to the third exemplary embodiment, with respect to an image subjected to normal white balance processing, immediately before the image is displayed, white balance processing using previous information about achromatic regions is performed once again.

Then, two images, i.e., an image obtained by re-performing white balance processing and an image obtained by performing normal white balance control, can be displayed.

While an image obtained in the third exemplary embodiment is close to original colors, an image obtained by performing normal white balance processing might be sometimes closer to apparent colors. On the assumption of such a case, the third exemplary embodiment enables obtaining two types of images and allowing selection of a favorable one.

Next, a fourth exemplary embodiment of the present disclosure is described. In the above-described exemplary embodiments, for example, in a case where, under low illuminance, an achromatic region has changed, for example, a case where a white car has moved in a dark condition, white balance processing may not be able to be correctly performed. Therefore, the fourth exemplary embodiment is provided with a unit for detecting beforehand a region in which a change may occur in an achromatic region and a unit for, in a case where no achromatic region is able to be detected, detecting a change of a stored achromatic region and varying weighting to the region. Furthermore, a hardware configuration of the image processing apparatus according to the fourth exemplary embodiment is similar to that illustrated in FIG. 1, and is, therefore, omitted from description.

Figure 10:
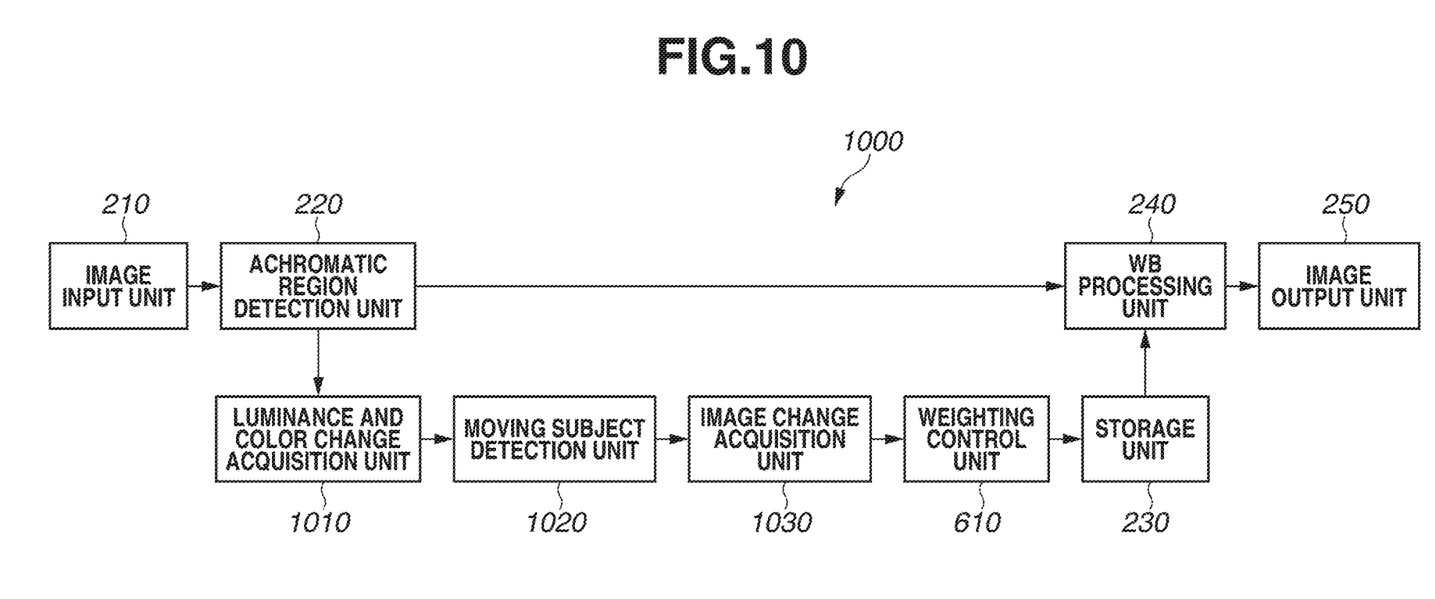
FIG. 10 is a block diagram illustrating a functional configuration example of an image processing apparatus according to a fourth exemplary embodiment.

FIG. 10 is a block diagram illustrating a functional configuration example of an image processing apparatus 1000 according to the fourth exemplary embodiment. In the following description, only functions different from the functions illustrated in FIG. 6 are described.

In the second exemplary embodiment, the weighting control unit 610 compares coordinate position information about an achromatic region detected by the achromatic region detection unit 220 and coordinate position information about an achromatic region stored in the storage unit 230 with each other and performs addition of weighting for the respective regions. On the other hand, in the fourth exemplary embodiment, a luminance and color change acquisition unit 1010, a moving subject detection unit 1020, and an image change acquisition unit 1030 detect coordinate position information about achromatic regions detected by the achromatic region detection unit 220 and changes of coordinate positions of achromatic regions stored in the storage unit 230 and vary weighting for the respective regions.

Figures 11, 11A:
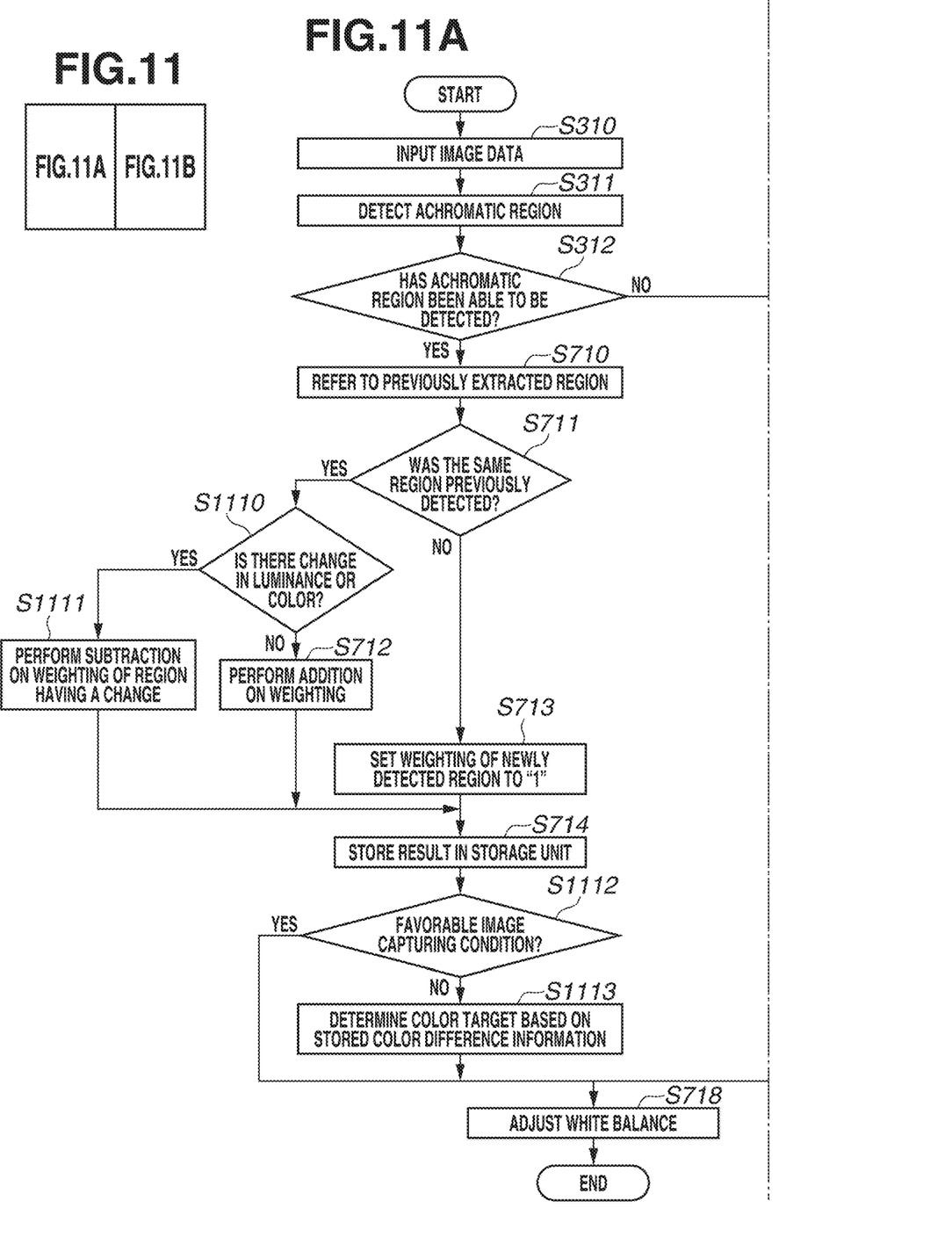
Figure 11B:
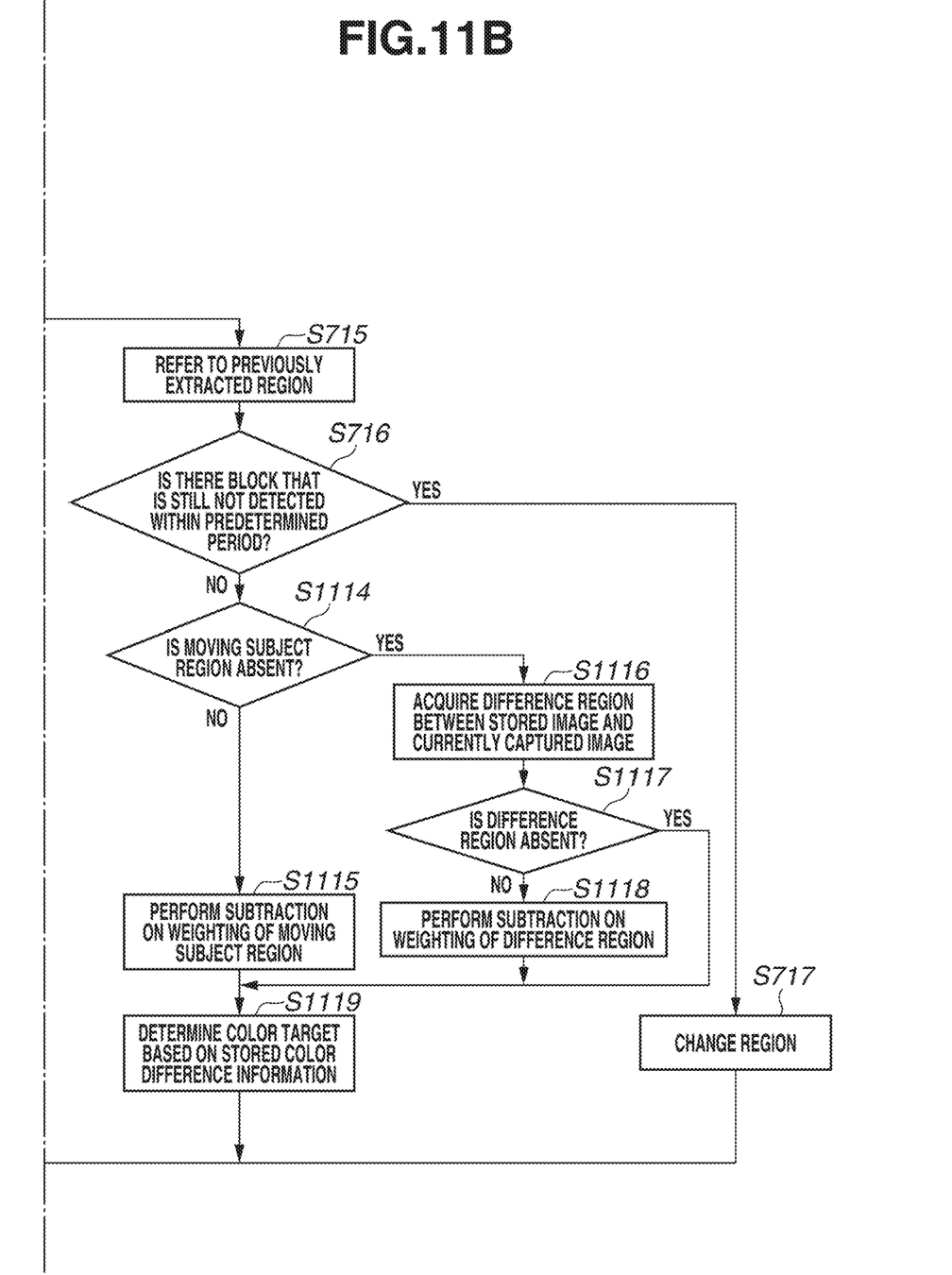

FIG. 11, which is composed of FIGS. 11A and 11B, is a flowchart illustrating an example of a processing procedure for performing white balance control in the fourth exemplary embodiment. In the following description, processing operations similar to those illustrated in FIG. 7 are omitted from description.

If, in step S312, it is determined that the values of RGB or color-difference information such as CrCb is within the predetermined threshold value range (an achromatic region has been detected) (YES in step S312), the processing proceeds to step S710, in which the weighting control unit 610 reads out information about a region previously detected as an achromatic region. In step S711, the weighting control unit 610 compares a region currently detected as an achromatic region and a region previously detected as an achromatic region (including a portion which is a region having a weighting of "1" or more and which is currently excluded from achromatic regions) with each other. If, in step S711, it is determined that there is a consistent region between a region currently detected as an achromatic region and a region previously detected as an achromatic region read out from the storage unit 230 (YES in step S711), the processing proceeds to step S1110. Then, in step S1110, the luminance and color change acquisition unit 1010 reads out, from the storage unit 230, luminance information and color information about a region previously detected as an achromatic region and refers to the luminance information and color information.

Next, in step S1110, the luminance and color change acquisition unit 1010 makes a comparison in luminance information and color information between a region currently detected as an achromatic region and a region previously detected as an achromatic region. Then, the luminance and color change acquisition unit 1010 determines whether there is a region large in variation in luminance information or color information. Even among regions determined to be an achromatic region, a region with a large change in luminance or color can be said to be a region which has a high possibility of a color change also occurring in the future and which is low in reliability. If, in step S1110, it is determined that there is a region large in variation in luminance information or color information (YES in step S1110), then in step S1111, the weighting control unit 610 performs subtraction on the weighting of the region.

Next, in step S1112, the WB processing unit 240 determines whether the current image capturing condition is favorable in view of setting values of the shutter speed, gain, and aperture value. If it is determined that the image capturing condition is not favorable (NO in step S1112), then in step S1113, the WB processing unit 240 reads out, from the storage unit 230, color information about a region detected as an achromatic region and refers to the color information, and then determines a target value serving as a target for color adjustment based on the previous color information about the achromatic region.

On the other hand, if, in step S312, it is determined that the values of RGB or color-difference information such as CrCb is outside the predetermined threshold value range (no achromatic region has been able to be detected) (NO in step S312), the processing proceeds to step S715, in which the achromatic region detection unit 220 reads out information about a region previously detected as an achromatic region. In step S716, the achromatic region detection unit 220 determines whether there is a block that is still not detected as an achromatic region within a predetermined period from among blocks for achromatic regions. If, in step S716, it is determined that there is no block that is still not detected as an achromatic region within a predetermined period (NO in step S716), the processing proceeds to step S1114.

In step S1114, the moving subject detection unit 1020 determines whether the coordinate position of an achromatic region stored in the storage unit 230 and a region in which a moving subject has occurred coincide with each other. In a case where a region in which a moving subject has occurred and the stored coordinate position of an achromatic region coincide with each other, even if there is an achromatic region with a high weighting, the region can be determined to be low in reliability. If it is determined that a region in which a moving subject has occurred and the stored coordinate position of an achromatic region coincide with each other (NO in step S1114), the processing proceeds to step S1115, in which the weighting control unit 610 performs subtraction on the weighting of the region with respect to which it is determined that a region in which a moving subject has occurred and the stored coordinate position of an achromatic region coincide with each other.

On the other hand, if, in step S1114, it is determined that a moving subject region has not been able to be detected by the moving subject detection unit 1020 (YES in step S1114), then in step S1116, to determine whether the coordinate position of an achromatic region stored in the storage unit 230 is reliable, the image change acquisition unit 1030 acquires a change between an image obtained at the time of detection of the achromatic region stored in the storage unit 230 and a currently captured image, and, in step S1117, the image change acquisition unit 1030 determines a result of the acquisition.

In step S1117, with respect to the acquired difference region in images, the image change acquisition unit 1030 determines whether the coordinate position of the achromatic region stored in the storage unit 230 and the region in which a difference has occurred coincide with each other. In a case where the region in which a difference has occurred and the stored coordinate position of the achromatic region coincide with each other, even if there is an achromatic region with a high weighting, the region can be determined to be low in reliability. If it is determined that the region in which a difference has occurred and the stored coordinate position of the achromatic region coincide with each other (NO in step S1117), the processing proceeds to step S1118, in which the weighting control unit 610 performs subtraction on the weighting of the region with respect to which it is determined that the region in which a difference has occurred and the stored coordinate position of the achromatic region coincide with each other.

As described above, the fourth exemplary embodiment is configured to vary weighting based on a difference between an achromatic region that was previously detected and information about an image obtained at the time of such detection and, in addition, a current moving subject and a currently captured image. With this, in a case where no achromatic region is able to be detected and previous information is, therefore, referred to, it becomes possible to perform color adjustment based on a region having a higher possibility of being an achromatic region and having a little change.

Moreover, according to the fourth exemplary embodiment, even in a case where there is a change in frame in which image capturing is being performed and achromatic regions are changing, appropriate colors can be obtained. While it can be supposed that a region a result of weighting for which is high is a place which has a higher possibility of having previously been an achromatic region and in which a change is unlikely to occur, a change may also occur in such a region. Therefore, in the case of using a result of weighting, changing a moving subject region, a difference from the previous region, and a target for white balance enables obtaining appropriate colors.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, combinations thereof, or the like (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-231970, filed Dec. 1, 2017, and No. 2018-193495, filed Oct. 12, 2018, which are hereby incorporated by reference herein in their entirety.

What is claimed is:

1. An image processing apparatus that processes image data obtained by image capturing, the image processing apparatus comprising:
one or more memories;
one or more processors or circuitry configured to function as following units:
a determination unit configured to determine an achromatic region position based on an achromatic region detected in first image data obtained by the image capturing;
a storing unit configured to store the achromatic region position determined by the determination unit in the one or more memories; and
a calculation unit configured to calculate a color correction parameter used for performing color correction processing on second image data obtained by image capturing performed later than that of the first image data, wherein the calculation unit calculates the color correction parameter based on color information about a position in the second image data corresponding to the achromatic region position stored in the one or more memories.

2. The image processing apparatus according to claim 1, wherein the one or more processors or circuitry are further configured to function as a detection unit configured to detect an achromatic region in image data,
wherein the detection unit changes a condition for detecting the achromatic region based on luminance of the image data.

3. The image processing apparatus according to claim 2, wherein, in a case where the luminance of the image data is smaller than a predetermined value, the detection unit determines that the achromatic region has not been detected.

4. The image processing apparatus according to claim 1, wherein the determination unit determines the achromatic region position based on achromatic regions detected in a plurality of pieces of image data including the first image data.

5. The image processing apparatus according to claim 4, wherein, with respect to an achromatic region detected in common in the plurality of pieces of image data, the determination unit increases weight of the achromatic region position.

6. The image processing apparatus according to claim 4, wherein the determination unit further determines the achromatic region position based on a difference between the plurality of pieces of image data.

7. The image processing apparatus according to claim 4, wherein the determination unit further determines the achromatic region position based on a change in luminance or color between the plurality of pieces of image data.

8. The image processing apparatus according to claim 4, wherein the determination unit further determines the achromatic region position based on a result of detection of a moving subject in the plurality of pieces of image data.

9. The image processing apparatus according to claim 1, wherein the image processing apparatus is a monitoring camera.

10. The image processing apparatus according to claim 1, wherein the one or more processors or circuitry are further configured to function as a detection unit configured to detect a change in angle of view of the image capturing,
wherein, in a case where a change in angle of view has been detected by the detection unit, the achromatic region position determined by the determination unit is not used.

11. The image processing apparatus according to claim 1, wherein the one or more processors or circuitry are further configured to function as a detection unit configured to detect a change in angle of view of the image capturing,
wherein, in a case where a change in angle of view has been detected by the detection unit, the determination unit determines a new achromatic region position based on the change in angle of view.

12. The image processing apparatus according to claim 1, wherein the calculation unit further calculates a color correction parameter used for performing the color correction processing on the second image data based on an achromatic region detected in the first image data.

13. The image processing apparatus according to claim 1, wherein the color correction processing is white balance correction processing.

14. A control method for an image processing apparatus that processes image data obtained by image capturing, the control method comprising:
determining an achromatic region position based on an achromatic region detected in first image data obtained by the image capturing;
storing the determined achromatic region position in one or more memories; and
calculating a color correction parameter used for performing color correction processing on second image data obtained by image capturing performed later than that of the first image data,
wherein the color correction parameter is calculated based on color information about a position in the second image data corresponding to the determined achromatic region position stored in the one or more memories.

15. A non-transitory computer-readable storage medium storing a program for causing a computer to execute following steps comprising:
determining an achromatic region position based on an achromatic region detected in first image data obtained by the image capturing;
storing the determined achromatic region position in one or more memories; and
calculating a color correction parameter used for performing color correction processing on second image data obtained by image capturing performed later than that of the first image data,
wherein the color correction parameter is calculated based on color information about a position in the second image data corresponding to the determined achromatic region position stored in the one or more memories.

* * * * *